3,150,968
INTERMETALLIC COMPOSITIONS AND BODIES
Albert James Stonehouse, Lyndhurst, and Robert M. Paine, Lakewood, Ohio, assignors to The Brush Beryllium Company, Cleveland, Ohio, a corporation of Ohio
No Drawing. Filed Nov. 2, 1962, Ser. No. 235,149
12 Claims. (Cl. 75—150)

This invention relates to intermetallic compositions, and more particularly to intermetallic compositions comprising an intermetallic compound and aluminum which formed into bodies have excellent oxidation resistance at temperatures in the intermediate temperature range of from about 1000° F. to about 1900° F.

Heretofore, it has been known that certain intermetallic compounds, namely beryllides, possess high strength, and excellent oxidation resistance at temperatures above 2300° F. Such properties are desirable for structural components subjected to elevated temperatures. Further, those beryllides which have low thermal neutron absorption cross sections may be used as fuel element components in nuclear systems, while those having high cross sections may be used for control-rod or shielding applications.

In the temperature range from about 1000° F. to about 1900° F., hereinafter referred to in the specification as the "intermediate temperature range," certain beryllides such as those of zirconium and niobium have exhibited excessive oxidation and/or spalling. "Spalling," as referred to herein, means the fracturing of the surface layers of the formed bodies when exposed to the intermediate temperature range of about 1000° F. to about 1900° F. These phenomena have been termed the "intermediate temperature problem" and will be referred to as such hereinafter.

Development of means to eliminate the cause of intermediate temperature failure was essential for the full realization of the properties of the beryllides adversely affected by these phenomena. Of the beryllides affected, zirconium-beryllide compounds and mixtures thereof were most severely influenced by the oxidative attack at intermediate temperatures. Niobium beryllides, to a lesser extent, also exhibit the intermediate temperature problem.

It is the principal object of this invention to provide new intermetallic beryllide compositions, and more particularly to provide such compositions which are capable of being formed into bodies having excellent oxidation resistance at intermediate temperature ranges of from about 1000° F. to about 1900° F., while retaining the known oxidation resistance at higher temperatures of the base beryllide.

It is a further object to provide such compositions which are capable of being formed into bodies which are substantially resistant to fracturing of the surface layers when exposed to and cooled from temperatures ranging from about 1000° F. to about 1900° F.

Another object is to provide intermetallic compositions capable of being made into bodies with excellent oxidation resistance at intermediate temperatures in moist as well as ambient air.

Further objects and advantages will become apparent from the following description.

In order to define the intermediate temperature oxidation problem more clearly, reference is made to Table I wherein are shown the results of a series of 100-hour oxidation tests in air, performed on various known beryllide bodies over the temperature range of about 800° F. to about 2000° F. This table excludes zirconium beryllide bodies, since they undergo accelerated or catastrophic oxidation between 1300° F. and 1600° F., inclusive, as shown in Table III.

*Table I*

OXIDATION TEST IN AMBIENT AIR ON VARIOUS KNOWN BERYLLIDE BODIES IN THE TEMPERATURE RANGE 800° F.-2000° F.

| Essentially Single Phase Beryllide Bodies | 800° F. | Average Penetration Calculated From Weight Gain Data in 100 Hours (mils) | | | | | | |
|---|---|---|---|---|---|---|---|---|
| | | 1,000° F. | 1,200° F. | 1,400° F. | 1,600° F. | 1,700° F. | 1,800° F. | 2,000° F. |
| $MoBe_{12}$ | N.D. | N.D. | <0.05 | N.D. | 0.05 | <0.05 | <0.05 | <0.05 |
| $NbBe_{12}$ | 0.05 | 0.06 | <0.05 | <0.05 | 5.6 | 11 | a 30 | 0.19 |
| $Nb_2Be_{19}$ | N.D. | <0.05 | <0.05 | <0.05 | (b) | c 7.8 | a 30 | (b) |
| $Nb_2Be_{17}$ | N.D. | N.D. | <0.05 | <0.05 | (b) | c 17.7 | a 30 | (b) |
| $Ta_2Be_{17}$ | 0.05 | N.D. | N.D. | <0.05 | <0.05 | <0.05 | <0.05 | <0.05 |
| $WBe_{12}$ | 0.05 | N.D. | <0.05 | <0.05 | 0.05 | <0.05 | 0.05 | 0.06 | a Scale thickness at least 30 mils; materials were severely fractured.
b Slight metal spalling and thin gray scale.
c Slight spalling on the edges after ten hours.
N.D.—No weight gain detected. Slight tarnish.

The above data in Table I show that only the niobium beryllide bodies are subject to excessive oxidation and/or spalling within the intermediate temperature range.

Accelerated oxidation at the intermediate temperatures of about 1000° F. to about 1900° F. is thus characteristic of the zirconium-beryllide bodies, as shown in Table III, and to a lesser extent of niobium-beryllide bodies.

Table II shows the effects of various atmospheres on $ZrBe_{13}$ tested at 1600° F. It will be noted that only those atmospheres containing oxygen produce the phenomena hereinabove mentioned.

*Table II*

EFFECT OF VARIOUS ATMOSPHERES ON THE OXIDATION AND POWDERING OF THE ESSENTIALLY SINGLE-PHASE $ZrBe_{13}$ BERYLLIDE BODY

[Test conditions: 1600° F., 24 hours]

| Atmosphere | Effect |
|---|---|
| Vacuum (less than 40 microns) | Very slight tarnish. |
| Flowing Argon $Ar_2$ | Do. |
| Flowing Nitrogen $N_2$ | Do. |
| Flowing Carbon Monoxide $CO_2$ | Thin black film. |
| Flowing Oxygen $O_2$ | Spalling and powdering. |
| Flowing, Dry $CO_2$—Free Air | Do. |
| Still, laboratory air | Do. |
| Flowing Moist Air | Do. |
| Flowing Moist $Ar_2$ | Very thin scale. |

By adding 0.25%, weight percent, aluminum to the essentially single-phase beryllide, $ZrBe_{13}$, and testing the formed body in the intermediate temperature range, it was unexpectedly found that the aluminum markedly affected the intermediate temperature oxidation resistance of this compound. Table III below shows that this addition completely eliminated the catastrophic oxidation of $ZrBe_{13}$ at 1200° F., 1600° F. and 1700° F. Accelerated oxidation was still observed at 1400° F. and 1500° F.

Table III

ESSENTIALLY SINGLE PHASE BERYLLIDE BODIES TESTED IN LABORATORY AIR AT TEMPERATURES BETWEEN 1200°–1700° F.

| Example | Composition of Specimen Body | Percent of Body Powdered After 24 Hrs. | | | | | |
|---|---|---|---|---|---|---|---|
| | | 1200° F. | 1300° F. | 1400° F. | 1500° F. | 1600° F. | 1700° F. |
| Control | $ZrBe_{13}$ | 3 | a 63 | 100 | 100 | 100 | b 0 |
| 1 | $ZrBe_{13}+0.25\%$ Al | 0 | 0 | 95 | 100 | 0 | 0 | a Severe fracturing of the specimen occurred.
b Medium to heavy oxide scale formed, generally adherent.

The specimen body of Example I was prepared by intimately mixing 500 grams of minus 200 mesh $ZrBe_{13}$ powder, prepared by attritioning the solid state reaction product of stoichiometric mixtures of the elemental metal powder, with 1.25 grams of minus 200 mesh aluminum powder to form a composition in which the aluminum was 0.25%, by weight of the composition. The composition was hot pressed in a graphite die and held at maximum temperatures and pressures of about 2750° F. and 1600 p.s.i., respectively, for about 20 minutes. The pressure was then released and the maximum temperature maintained for about 40 minutes until the body was annealed. The heating unit was then turned off and the body allowed to cool in the furnace to room temperature. The body has the dimensions 3½" x 2½" x 1¼" and a density of 2.76 g./cc., which represented 100% of the absolute density.

The specimen bodies of Examples 2 through 11 were prepared in accordance with the procedure employed in the preparation of the specimen body of Example 1, with the exceptions of the variations in the weight percent of aluminum specified in Tables III through VI, and of the maximum temperatures and pressures ranging of from about 2700° F. to about 2800° F. and from about 1500 p.s.i. to about 2000 p.s.i., respectively. The bodies were of substantially full density.

By increasing the aluminum content to 0.35%, the accelerated oxidation at 1400° F. and 1500° F. was completely eliminated and by increasing the aluminum content to 0.45% and 1.0%, the total weight gain in mgm./cm.² was significantly improved, as shown in Table IV below.

Table IV

INTERMEDIATE TEMPERATURE TESTING OF ESSENTIALLY SINGLE-PHASE $ZrBe_{13}$ CONTAINING ADDED ALUMINUM

| Example | Composition of Specimen Body | Test Temp. (° F.) | Time at Temp. (hr.) | Weight Gain (mg./cm.²) |
|---|---|---|---|---|
| 2 | $ZrBe_{13}+0.35\%$ Al | 1,200 | 64 | 0.06 |
| | | 1,300 | 96 | 0.05 |
| | | 1,400 | 98 | 0.22 |
| | | 1,500 | 96 | a 15.7 |
| | | 1,600 | 96 | 0.22 |
| | | 1,700 | 135 | 0.94 |
| 3 | $ZrBe_{13}+0.45\%$ Al | 1,200 | 116 | 0.05 |
| | | 1,300 | 96 | 0.02 |
| | | 1,400 | 116 | 0.07 |
| | | 1,500 | 120 | 0.03 |
| | | 1,600 | 136 | 0.26 |
| | | 1,700 | 96 | 0.34 |
| 4 | $ZrBe_{13}+1\%$ Al | 1,200 | 100 | 0.08 |
| | | 1,300 | 100 | 0.00 |
| | | 1,400 | 100 | 0.00 |
| | | 1,500 | 100 | 0.11 |
| | | 1,600 | 100 | 0.33 |
| | | 1,700 | 100 | 2.21 | a Slight breakup on one edge due to "edge effect."

The "edge effect" noted above for the 0.35% Al addition at 1500° F. is believed due to the depletion of the Al from the area in proximity to the outside edge of the hot-pressed block. The other surfaces of the specimen tested at this temperature did not show such an effect.

The less beryllium-rich, essentially single-phase beryllide $Zr_2Be_{17}$ was modified similar to the $ZrBe_{13}$ beryllide. Table V below shows the affects of an oxidizing atmosphere on this beryllide containing 0.4%, 1.0% and 3.0% aluminum.

Table V

| Example | Composition of Specimen Body | Test Temp. (° F.) | Time at Temp. in hrs. | Percent Oxidized | Weight Gain (mg./cm.²) |
|---|---|---|---|---|---|
| 5 | $Zr_2Be_{17}+0.4\%$ Al | 1,200 | 24 | 18.0 | |
| | | 1,300 | 24 | 100.0 | |
| | | 1,400 | 24 | 100.0 | |
| | | 1,500 | 24 | 100.0 | |
| | | 1,600 | 24 | 75.0 | |
| | | 1,700 | 24 | 2.8 | |
| 6 | $Zr_2Be_{17}+1.0\%$ Al | 1,200 | 24 | 6.5 | |
| | | 1,300 | 24 | 52.0 | |
| | | 1,400 | 24 | 100.0 | |
| | | 1,500 | 24 | 100.0 | |
| | | 1,600 | 24 | 37.2 | |
| | | 1,700 | 24 | | 1.15 |
| 7 | $Zr_2Be_{17}+3.0\%$ Al | 1,200 | 100 | | 0.15 |
| | | 1,300 | 100 | | 0.33 |
| | | 1,400 | 100 | | 0.36 |
| | | 1,500 | 100 | | 0.40 |
| | | 1,600 | 100 | | 1.25 |
| | | 1,700 | 100 | | 1.74 |

Essentially single-phase $NbBe_{12}$ and $NbBe_{17}$ were each modified similar to the zirconium-beryllides. Table VI shows the results of 0.35%, 0.45% and 1.0% additions of aluminum to these beryllides.

Table VI

| Example | Composition of Specimen Body | Time at Temp. (hrs.) | Weight Gain, mg./cm.² | | |
|---|---|---|---|---|---|
| | | | 1700° F. | 1800° F. | 1900° F. |
| 8 | $NbBe_{12}+0.35\%$ Al | 72 | | 0.6 | 0.8 |
| | | 144 | | 12.3 | 1.2 |
| 9 | $NbBe_{12}+0.45\%$ Al | 72 | 1.7 | 0.6 | 0.5 |
| | | 144 | 0.2 | 1.0 | 1.8 |
| 10 | $NbBe_{17}+1.0\%$ Al | 72 | 0.25 | 1.5 | 1.8 |
| | | 144 | 0.29 | 1.9 | 2.3 |
| Control | $NbBe_{12}$ (no additive) | 100 | 91 | >250 | |
| Control | $Nb_2Be_{17}$ (no additive) | 100 | 149 | >250 | |

Although in the examples presented in Table III through VI, aluminum was incorporated in the specimen bodies by intimately mixing aluminum powder with various beryllide powders and vacuum hot-pressing the mixture to form the specimen bodies, other aluminum-containing compounds such as $Al_2O_3$, NiAl and aluminum containing materials which decompose upon heating in the presence of beryllium or beryllides to provide aluminum may be incorporated in the bodies, provided such materials do not produce undesirable properties or characteristics in the resultant bodies.

Beryllides are presently known to have common characteristics, such as high strength and excellent oxidation resistance at elevated temperatures of from about 2000° F. to about 3000° F. Consequently, the improvement described in the specification of the oxidation resistance properties of niobium and zirconium beryllides at intermediate temperatures of from about 1000° F. to about 1900° F. by the incorporation of aluminum in formed low-porosity bodies thereof would be expected by one skilled in the art to be attainable with other beryllides having the same intermediate temperature problem.

The aluminum is generally effective for the improvement in the above properties from 0.2% to about 3.0%, by weight, of the beryllide, and quantities above 3% have shown no additional improvement.

Having thus described our invention, we claim:

1. A metallic composition consisting essentially of from about 0.2% to about 3.0%, by weight, of aluminum, and the balance being an intermetallic compound selected from the group consisting of $ZrBe_{13}$, $ZrBe_{17}$, $NbBe_{12}$ and $Nb_2Be_{17}$.

2. A composition according to claim 1 wherein the intermetallic compound is $Nb_2Be_{17}$ and the aluminum is about 1.0%, by weight, of the composition.

3. A composition according to claim 1 wherein the intermetallic compound is $Zr_2Be_{17}$ and the aluminum is from about 1.0% to about 3.0%, by weight, of said composition.

4. A composition according to claim 1 wherein the intermetallic compound is $NbBe_{12}$ and the aluminum is from about 0.3% to about 0.5%, by weight, of the composition.

5. A composition according to claim 1 wherein the intermetallic compound is $ZrBe_{13}$ and the aluminum is from about 0.3% to about 1.0%, by weight, of the composition.

6. A composition according to claim 5 in which the aluminum is about 0.45%, by weight, of the composition.

7. A body consisting essentially of aluminum from about 0.2% to about 3.0%, by weight, of said body, the balance being an intermetallic compound selected from the group consisting of $ZrBe_{13}$, $Zr_2Be_{17}$, $NbBe_{12}$, and $Nb_2Be_{17}$, said body having excellent resistance to oxidation and spalling at temperatures ranging from about 1000° F. to about 1900° F.

8. A body according to claim 7 wherein the intermetallic compound is $Nb_2Be_{17}$ and the aluminum is about 1.0%, by weight, of the body.

9. A body according to claim 7 wherein the intermetallic compound is $Zr_2Be_{17}$ and the aluminum is from about 1.0% to about 3.0%, by weight, of said body.

10. A body according to claim 7 wherein the intermetallic compound is $NbBe_{12}$ and the aluminum is from about 0.3% to about 0.5%, by weight, of the body.

11. A body according to claim 7 wherein the intermetallic compound is $ZrBe_{13}$ and the aluminum is from about 0.3% to about 1.0%, by weight, of the body.

12. A body according to claim 11 wherein the aluminum is about 0.45%, by weight, of the body.

References Cited in the file of this patent
UNITED STATES PATENTS 1,254,987    Cooper ---------------- Jan. 29, 1918

OTHER REFERENCES

Acta Crystallographic, vol. 2, 1949, page 258.